US009919330B2

(12) United States Patent
Letard et al.

(10) Patent No.: US 9,919,330 B2
(45) Date of Patent: Mar. 20, 2018

(54) INSTALLATION FOR SPRAYING A COATING MATERIAL

(71) Applicant: SAMES TECHNOLOGIES, Meylan (FR)

(72) Inventors: François Letard, La Terrasse (FR); Patrick Ballu, Reims (FR)

(73) Assignee: SAMES KREMLIN, Meylan (FR)

( * ) Notice: Subject to any disclaimer, the term of this patent is extended or adjusted under 35 U.S.C. 154(b) by 0 days.

(21) Appl. No.: 14/423,012

(22) PCT Filed: Sep. 9, 2013

(86) PCT No.: PCT/EP2013/068616
§ 371 (c)(1),
(2) Date: Feb. 20, 2015

(87) PCT Pub. No.: WO2014/037562
PCT Pub. Date: Mar. 13, 2014

(65) Prior Publication Data
US 2015/0217318 A1 Aug. 6, 2015

(30) Foreign Application Priority Data
Sep. 10, 2012 (FR) .................................... 12 58466

(51) Int. Cl.
B05B 13/04 (2006.01)
B25J 5/02 (2006.01)
(Continued)

(52) U.S. Cl.
CPC ...... B05B 13/0221 (2013.01); B05B 13/0278 (2013.01); B05B 13/0431 (2013.01);
(Continued)

(58) Field of Classification Search
None
See application file for complete search history.

(56) References Cited

U.S. PATENT DOCUMENTS 4,423,999 A * 1/1984 Choly ................ B05B 13/0292
118/323
4,761,112 A 8/1988 Hammon
(Continued)

FOREIGN PATENT DOCUMENTS

CN 1052360 A 6/1991
CN 1726093 A 1/2006
(Continued)

OTHER PUBLICATIONS

International Search Report for PCT/EP2013/068616 dated Oct. 23, 2013.
French Search Report for FR1258466 dated Apr. 24, 2013.

Primary Examiner — Binu Thomas
(74) Attorney, Agent, or Firm — Pearne & Gordon LLP

(57) ABSTRACT

An installation for spraying a coating product on objects, such as motor vehicle bodies, that are moved by a conveyor (4) parallel to a conveying axis (X4) and having base (102) and mobile (104-108) portions. A multi-axis spraying robot (50) is dedicated to spraying a coating product. A multi-axis handling robot (60) is dedicated to maneuvering the mobile portion (104-106-108) of an object (100) to be coated relative to the base portion (102). Each robot is movable parallel to the conveying axis. Ventilation means provide a flow of ventilation air (F1) inside a booth (3), perpendicular to the conveying axis (X4). The spraying and handling robots (50, 60) are both slidably mounted along a same rail (8) parallel to the conveying axis (X4), and can pass each other. The rail is disposed upstream from the objects to be coated (100), in the direction of flow of the ventilation air (F1).

5 Claims, 3 Drawing Sheets

(51) Int. Cl.
*B25J 11/00* (2006.01)
*B25J 9/00* (2006.01)
*B05B 13/02* (2006.01)
*B05B 15/12* (2006.01)

(52) U.S. Cl.
CPC ............ *B05B 13/0452* (2013.01); *B25J 5/02* (2013.01); *B25J 9/0018* (2013.01); *B25J 9/0084* (2013.01); *B25J 11/0075* (2013.01); *B05B 15/12* (2013.01); *B25J 9/0009* (2013.01)

(56) References Cited

U.S. PATENT DOCUMENTS

| | | | |
|---|---|---|---|
| 4,785,760 A | 11/1988 | Tholome | |
| 8,875,647 B2 | 11/2014 | Herre | |
| 2006/0292308 A1 | 12/2006 | Clifford et al. | |
| 2008/0060575 A1 | 3/2008 | Meissner | |
| 2009/0320753 A1* | 12/2009 | Yoshino | B05B 13/0431 118/315 |
| 2012/0191243 A1* | 7/2012 | Haas | B25J 9/0084 901/1 |
| 2012/0260854 A1* | 10/2012 | Takebe | B25J 9/0084 118/500 |

FOREIGN PATENT DOCUMENTS

| | | | |
|---|---|---|---|
| CN | 101168252 A | | 4/2008 |
| CN | 101657264 A | | 2/2010 |
| EP | 0274322 A1 | | 7/1988 |
| EP | 1749584 A1 | | 7/2007 |
| EP | 2 123 365 A1 | | 11/2009 |
| JP | S59-15469 U | | 1/1984 |
| JP | S60-58260 A | | 4/1985 |
| JP | H01-266810 A | | 10/1989 |
| JP | H03-34868 U | | 4/1991 |
| JP | H03-44576 | | 4/1991 |
| JP | H03-77662 A | | 4/1991 |
| JP | H04-135134 U | | 12/1992 |
| JP | H06-312385 | * | 8/1994 |
| JP | H06-312385 A | | 8/1994 |
| JP | H06-296913 A | | 10/1994 |
| JP | 2011-525418 A | | 9/2011 |
| JP | 2012-144856 A | | 8/2012 |
| RU | 69949 U1 | | 1/2008 |
| RU | 2008149126 A | | 6/2010 |
| SU | 986776 A1 | | 1/1983 |
| SU | 1440556 A1 | | 11/1988 |
| WO | 2004/037430 A1 | | 5/2004 |
| WO | 2005046880 A2 | | 5/2005 |
| WO | 2008-108401 A1 | | 9/2008 |
| WO | 2009-146936 A1 | | 12/2009 |

* cited by examiner

INSTALLATION FOR SPRAYING A COATING MATERIAL

This application is a National Stage application of PCT international application PCT/CN2013/068616, filed on Sep. 9, 2013 which claims the priority of French Patent Application No. 12 58466 entitled "INSTALLATION FOR SPRAYING A COATING MATERIAL", filed with the European Patent Office on Sep. 10, 2012, both of which are incorporated herein by reference in their entirety.

The invention relates to an installation for spraying a coating product on objects, such as motor vehicle bodies, moved by a conveyor.

In the automobile industry, it is known to use multi-axis robots to apply a coating such as a finisher, paint or varnish on the body of a motor vehicle moved by a constant speed or stop and go conveyor.

Motor vehicle bodies generally comprise a body shell that makes up a fixed part, as well as opening members, such as doors, a hood, a trunk panel and a tailgate. In order to access the inside of the passenger compartment, the engine compartment or the trunk so as to coat some of its surfaces, it is necessary to manipulate these opening members, in particular to arrange a passage for the coating product sprayer.

It is thus known from WO-A-2005/046880 to use a painting robot sliding along a first rail and robots for opening doors and hoods sliding along a second rail installed in the lower part of the lateral partition of a spray booth. Using two superimposed rails to allow the sliding of a painting robot on the one hand, and handling robots on the other hand, makes the known installation more complex and expensive. Furthermore, the second rail, along which the handling robots slide, limits access to the booth through the partition that it borders. The handling robots generally positioned below the painting robot may receive excess paint, or "overspray", which, once sprayed by the spraying robot, is not deposited directly on the body. In other words, the handling robots are quickly dirtied by excess paint. Lastly, in the event the spraying robot uses a rinsing box and/or a cleaning/filling station, like the sprayer equipped with a reservoir considered in EP-A-0 274 322, the bulk of the second support rail for the handling robots requires positioning the rinsing box and/or the cleaning/filling station past that second rail, in a direction globally parallel to the direction of forward motion of the vehicles. This causes large amplitude movements of the spraying robot, at the end of each painting cycle.

Similar problems arise in other facilities for spraying a coating product on objects moved by a conveyor, when those objects comprise a base part and at least one moving part that must be moved by a handling robot.

The invention more particularly aims to resolve these drawbacks by proposing a new installation for spraying a coating product that makes it possible to apply a coating product effectively on an object comprising a base part and a moving part, without substantially limiting access to the booth, while greatly avoiding dirtying and, if applicable, without requiring long longitudinal movements by a spraying robot.

To that end, the invention relates to an installation for spraying a coating product on objects, such as motor vehicle bodies, moved by a conveyor parallel to a conveying axis and comprising at least a base part and a part moving relative to the base part. This installation comprises at least one first multi-axis spraying robot, dedicated to spraying a coating product, as well as at least one multi-axis handling robot, dedicated to maneuvering a moving part of an object to be coated relative to its base part, each robot being movable parallel to the conveying axis. This installation also comprises a booth, as well as ventilation means that ensure a flow of ventilation air inside the booth, in a direction perpendicular to the conveying axis. According to the invention, the two spraying and handling robots are mounted sliding along a same rail parallel to the conveying axis, and are able to pass one another, while that rail is positioned upstream from the object to be coated, in the flow direction of the ventilation air.

Owing to the invention, the assembly of the spraying robot and the handling robot on a same rail makes it possible to position those robots in a zone that does not hinder access to the booth. Since the rail is upstream from the objects to be coated, the excess coating particles or overspray are moved away from the rail by the flow of ventilation air and, to a large extent, the robots, which limits dirtying of that rail and those robots. Lastly, in the event the spraying robot uses a rinsing box and/or a cleaning/filling station, that rinsing box and/or that cleaning/filling station can be positioned near the bodies to be coated, since the inner surface of the side panels of the spraying booth is not cluttered by a rail dedicated to the handling robot.

According to advantageous but optional aspects of the invention, such an installation may incorporate one or more of the following features, considered in any technically allowable combination:

The flow of ventilation air in the booth is vertical and downward, while the rail is positioned above the objects to be coated.

Each robot comprises a carriage mounted sliding on the rail and on which an arm is articulated whereof the end opposite the carriage bears, for the spraying robot, a coating product sprayer and, for the handling robot, a handling member, while the two carriages are mounted on two opposite or adjacent sides of the rail.

The rail has a polygonal section and each carriage slides along at least one surface of that rail.

The rail has a square or rectangular section and the carriages slide on two opposite sides of the rail.

The rail has a U- or C-shaped section and a first carriage belonging to one of the robots slides along at least one inner surface of the rail, while a second carriage belonging to the other robot slides along at least one outer surface of the rail.

At least one of the carriages slides along at least one of the two adjacent surfaces of the rail.

The rail comprises at least one surface along which part of the carriage of the spraying robot and part of the carriage of handling robot slide.

The movement of each carriage along the rail is driven by a motor equipped with a pinion meshing with a rack. Alternatively, each carriage can be moved along the rail by a belt, chain or cable transmission system.

The invention will be better understood and other advantages thereof will appear more clearly in light of the following description of four embodiments of an installation according to its principle, provided solely as an example and done in reference to the appended drawings, in which.

Figure 1:
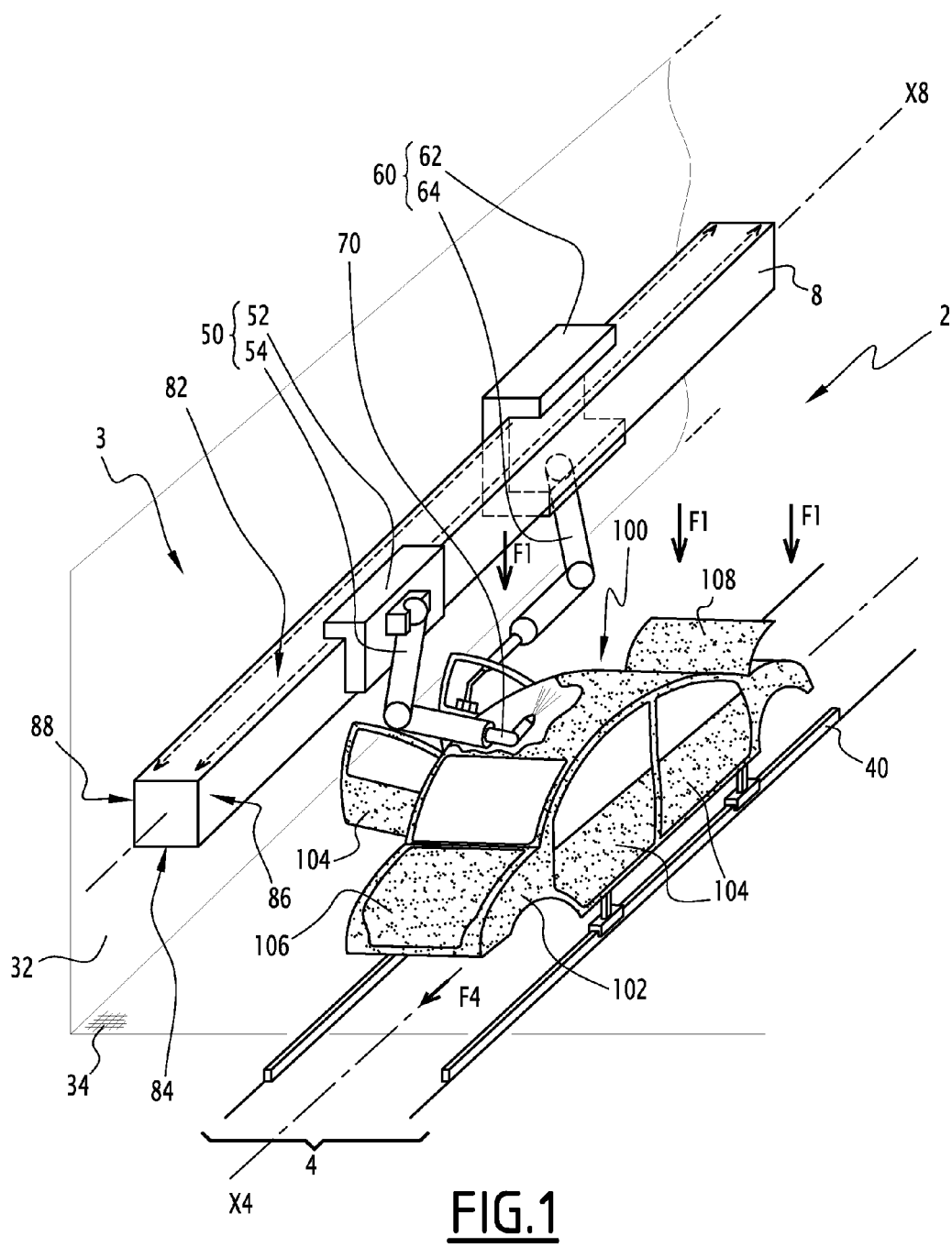
FIG. 1 is a diagrammatic perspective illustration of a coating installation according to the invention.
Figure 2:
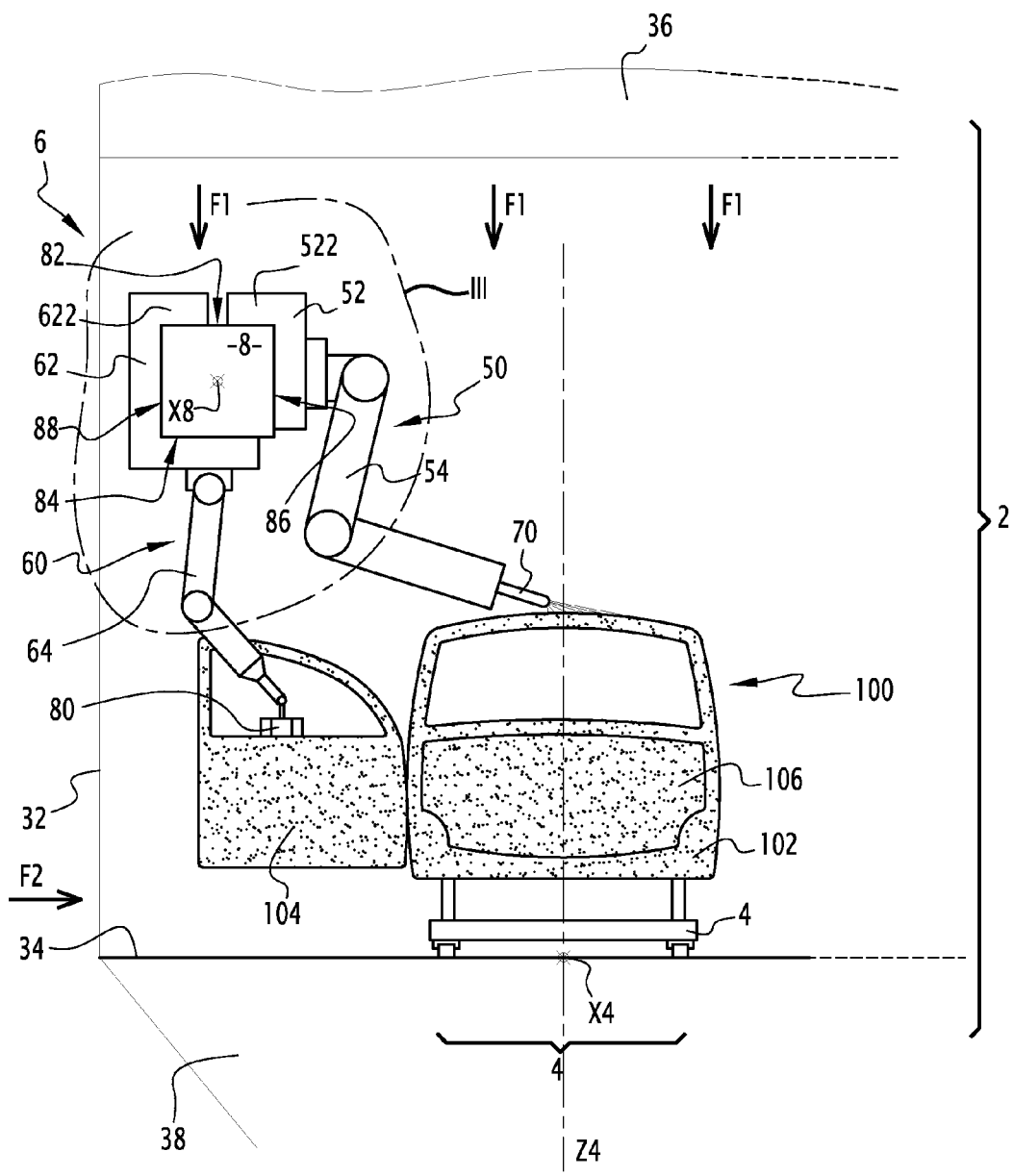
FIG. 2 is a view along arrow II in FIG. 1.

The installation 2 shown in FIGS. 1 and 2 is designed to apply paint on motor vehicle bodies 100 moved by a conveyor 4 parallel to a horizontal conveying axis X4.

The conveyor 4 operates at a constant speed, such that the bodies are painted as they pass by. Alternatively, the conveyor may make stops, during which the spraying phases take place. This is referred to as a "stop and go" conveyor. In FIG. 1, arrow F4 shows the direction of forward motion of the bodies 100 along the axis X4.

Each body 100 comprises a body shell 102, four doors 104, a hood 106 and a trunk panel 108. The parts 104, 106 and 108 make up the opening members of the body 100. For clarity of the drawing, the body 100 is shown very diagrammatically in FIGS. 1 and 2. In particular, the inner volume of this body is not shown.

The installation 2 also comprises a booth 3 inside which the bodies 100 circulate that are moved by the conveyor 4, using carriages 40 each forming a body support. The booth 3 comprises two lateral partitions, one of which is shown in the figures with reference 32, as well as a floor 34 formed by a grating, as shown very diagrammatically and partially in FIG. 1.

In FIGS. 1 and 2, the partition opposite the partition 32 shown on the left of FIG. 2 is not shown, for simplification purposes.

The booth 3 also comprises a ventilation plenum 36 positioned above the bodies 100 and the conveyor 4. This plenum 36 comprises ventilation means (not shown) known in themselves, in particular fans, that make it possible to establish a downward and vertical flow of air F1 inside the booth 6. The airflow F1 is perpendicular to the axis X4 and thus passes through the booth from top to bottom, from the plenum 36 toward a zone 38 situated below the floor 34 and designed to collect excess paint or overspray which, although sprayed in the booth, was not deposited on a body 100.

The installation 2 also comprises a rail 8 positioned inside the booth 3 and a longitudinal and central axis X8 of which is parallel to the axis X4. The rail 8 has a square section and supports two robots 50 and 60 respectively dedicated to spraying a coating product on the bodies 100 and handling the opening members 104, 106 and 108.

The robot 50 comprises a carriage 52 equipped with an electric motor, not shown, the output shaft of which drives a pinion engaged with a rack mounted in the rail 8. Thus, actuating the electric motor makes it possible to move the carriage 52 along the rail 8, parallel to the axis X8 and in both directions.

References 82 and 84 respectively denote the upper and lower surfaces of the rail 8. References 86 and 88 respectively denote the left and right surfaces thereof, the surfaces being determined with the same orientation as the left and right sides of a body 100 moving parallel to the axis X4, in the direction of arrow F4 in FIG. 1.

The carriage 52 moves along the surfaces 82 and 86 of the rail 8 that it partially overlaps.

A poly-articulated arm 54 is articulated by a proximal end on the carriage 52 and supports, at its distal end, a coating product sprayer 70 of the electrostatic type. According to one optional aspect of the invention that is not shown, this sprayer 70 may incorporate a temporary storage reservoir for a spraying product, according to the technical teaching of EP-A-0,274,322.

Alternatively, the sprayer may not be electrostatic.

Thus, the robot 50 makes it possible to move the sprayer 70 across from the body 100, to apply a layer of coating product on it.

The handling robot 60 comprises a carriage 62 sliding parallel to the axis X8 along the rail 8 and which has a cross-section at the axis X8 that is globally U-shaped with a flat bottom. The carriage 62 thus partially overlaps the surfaces 82, 84 and 88 of the rail 8.

References 522 and 622 respectively denote the parts of the carriages 52 and 62 that partially overlap the surface 82 of the rail 8. These parts 522 and 622 have a length, measured perpendicular to the axis X8 and parallel to the surface 82, smaller than half of the width of the surface 82, such that the carriages 52 and 62 do not interfere when they must pass one another, for example due to movements in opposite directions along the rail 8.

Thus, the robots 50 and 60 are mounted sliding along the rail 8, and are able to pass one another.

The handling robot 60 also comprises a poly-articulated arm 64 articulated on the carriage 62 by a first proximal end and the distal end of which bears a tool 80 that makes it possible to manipulate an opening member of the body 100, such as a door 104 in the configuration of FIGS. 1 and 2.

The rail 8 is positioned above a body 100 in place on the conveyor 4 in the booth 6. In other words, considering a vertical axis Z4 secant with the axis X4, the rail 8 is positioned, along the axis Z4, in front of the body 4, in the direction of the ventilation airflow shown by the arrows F1.

Thus, the particles of coating product, whether it involves a liquid or powdered coating product, that are not deposited on the body 100, are driven by the flow of ventilation air shown by the arrows F1 opposite the rail 8, which limits the risks of the coating product polluting that rail, the carriages 52 and 62 and the proximal parts of the arms 64 and 54.

The fact that the rail 8 is above the bodies 100 means that its surface 84 extends at a vertical distance, measured parallel to the axis Z4, from the floor 34 that is strictly larger than the maximum vertical distance between the floor 34 and the roof of a body 100 in place on the conveyor 4 in the booth 3.

In the example of the figures, the rail 8 is positioned closer to the partition 32 than the axis Z4. Alternatively, the rail 8 may be aligned with the axis Z4. According to another alternative, the rail 8 may be closer to the side partition, not shown in the figures, than the partition 32.

Furthermore, inasmuch as the rail 8 is situated at a relatively significant height, in practice higher than 2 meters, relative to the floor 34, it is possible to provide access to the inside of the booth 6 through the partition 62, in the direction of arrow F2 in FIG. 2, below the rail 8. In fact, no rail positioned in the lower part of the partition 32 hinders the access to the inner volume of the booth 6.

Furthermore, if, as considered above, the spraying robot uses a rinsing box and/or a cleaning/filling station, it is possible to position the rinsing box and/or the cleaning/filling station near the body 100 in the configuration of FIGS. 1 and 2 along the wall 62.

Figure 3:
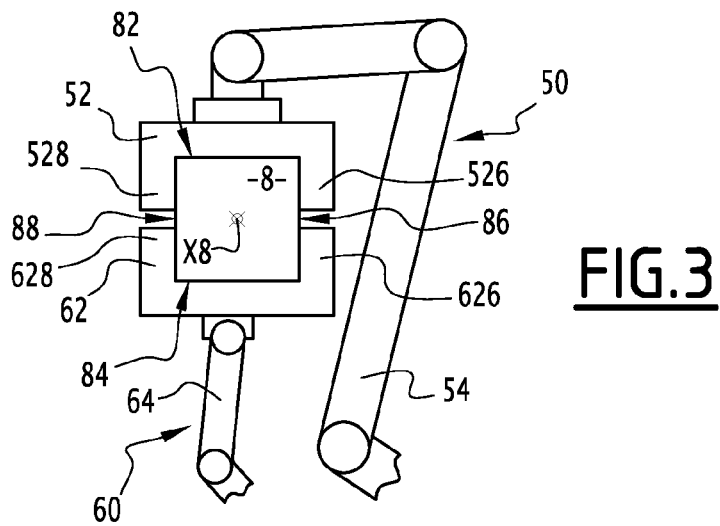
FIG. 3 is a view similar to detail III of FIG. 2 for an installation according to a second embodiment.
Figure 4:
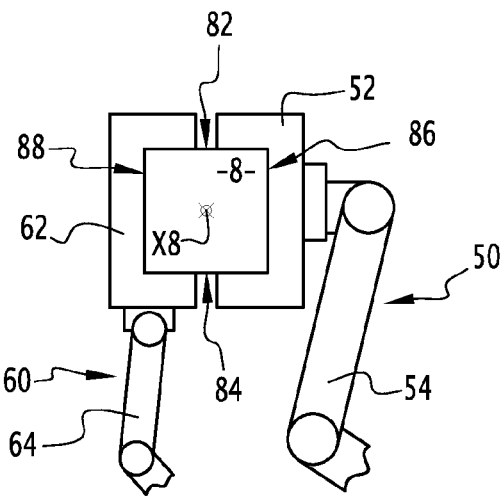
FIG. 4 is a view similar to FIG. 3 for an installation according to a third embodiment of the invention.

In the second and third embodiments of the invention shown in FIGS. 3 and 4, the elements similar to those of the first embodiment bear the same references. Below, only the aspects that differentiate these second and third embodiments from the first are described.

In the second embodiment, the carriages 52 and 62 of the robots 50 and 60 each have a U-shaped cross-section with a flat bottom perpendicular to the axis X8 of the rail 8.

The carriage 52 of the spraying robot 50 partially overlaps the upper surface 82 of the side surfaces 86 and 88 of the rail 8, while the carriage 62 of the handling robot 60 also has a U-shaped cross-section with a flat bottom, while overlapping the inner surface 84 of the side surfaces 86 and 88 of the rail 8. References 526 and 528 respectively denote the parts of the carriage 52 that overlap the surfaces 86 and 88. References 626 and 628 denote the parts of the carriage 62 that overlap the surfaces 86 and 88. The length of the parts 526 and 626, on the one hand, and 528 and 628 on the other hand, measured vertically, is such that the carriages 52 and 62 can pass one another without interference.

In the embodiment of FIG. 4, the structure considered for the second embodiment is rotated by 90° clockwise around the axis X8. In other words, the carriage 52 partially overlaps the left side surface 86 and the upper and lower surfaces 82 and 84 of the rail 8, while the carriage 62 partially overlaps the right side surface 88 and the upper and lower surfaces 82 and 84.

In FIGS. 1 to 4, the carriages 52 and 62 are shown sliding along three surfaces of the rail 8. Alternatively, these carriages can slide along two surfaces, or even along only one of those surfaces. In both cases, the carriages 52 and 62 can slide on two adjacent sides of the rail 8.

Figure 5:
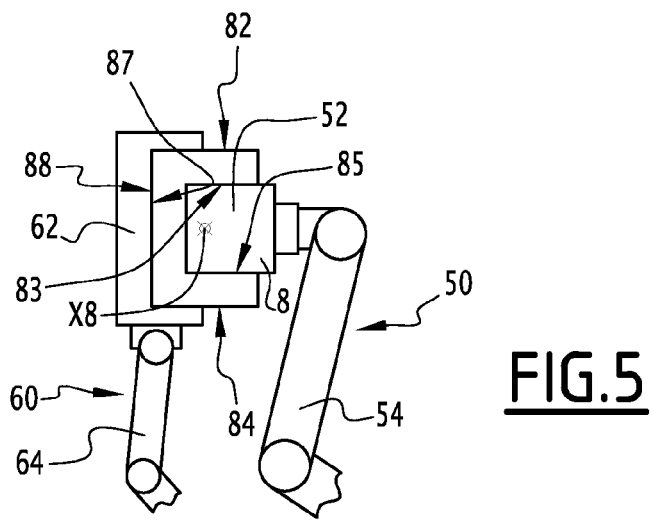
FIG. 5 is a view similar to FIG. 3 for an installation according to a fourth embodiment of the invention.

In the embodiment of FIG. 5, the rail 8 has a C-shapes polygonal section, i.e., a U-shaped section with a flat bottom laying on one side. The rail 8 thus defines an inner volume delimited by an upper surface 83, a lower surface 85 and a left side surface 87. The carriage 52 of the robot 50 is engaged in the inner volume and slides in that volume along its surfaces 83, 85 and 87. Alternatively, the carriage 52 can have a geometry such that it does not simultaneously come into the vicinity of the three surfaces 83, 85 and 87. It in fact suffices for the carriage 52 to slide along at least one inner surface of the rail 8. In that case, it travels along one or two inner surfaces of the rail 8.

Furthermore, the carriage 62 of the robot 60 is mounted sliding on the outside of the rail 8 and partially overlaps the upper 82, lower 84 and left side 88 outer surfaces of the rail 8. Alternatively, the carriage 62 may only slide along one or two of those surfaces.

FIG. 5 shows that the longitudinal axis X8 of the rail 8 is situated in its inner volume.

According to an alternative of the invention that is not shown, the rail 8 may be rotated by 90° to the left relative to its configuration of FIG. 5, i.e., have a U-shaped section, with an opening on top. According to another alternative, this rail 8 may be rotated by 90° to the right relative to the configuration of FIG. 5, i.e., have an upside down U-shaped configuration.

In the different embodiments considered above, the carriages 52 and 62 are mounted on two opposite or adjacent sides of the rail, to limit the risks of interferences upon passing one another, without, however, decreasing the size of those carriages in a manner that could make them fragile or make the robots 50 and 60 unstable.

In the illustrated embodiments, the carriages 52 and 62 can be reversed. Thus, the carriage 52 may belong to the handling robot, while the carriage 62 belongs to the spraying robot.

According to an alternative of the invention that is not shown, applicable to all of the embodiments, the driving of the carriages 52 and 62 along the rail 8 can be done using a belt, chain or cable system.

Alternatively, the rail 8 may have a polygonal cross-section other than square, for example rectangular. In that case, the geometry of the carriages 52 and 62 is adapted. In general, a carriage partially overlaps at least two adjacent surfaces of the rail 8.

Alternatively, two or more than two spraying robots 50 and/or two or more than two handling robots 60 can be mounted sliding along the rail 8.

The technical features of the embodiments and alternatives considered above may be combined.

The invention claimed is:

1. An installation for spraying a coating product on objects, said objects moved by a conveyor parallel to a conveying axis and said objects comprising at least a base part and a part moving relative to the base part, said installation comprising:
   at least a first multi-axis spraying robot, dedicated to spraying a coating product,
   at least one multi-axis handling robot, dedicated to maneuvering a moving part of an object to be coated relative to its base part, each robot being movable parallel to the conveying axis,
   a booth, and
   ventilation means that ensure a flow of ventilation air inside the booth, in a direction perpendicular to the conveying axis,
   wherein both the spraying robot and the handling robot are slidably mounted on a same rail parallel to the conveying axis, and are able to pass one another, while that rail is positioned upstream from the object to be coated, in the flow direction of the ventilation air,
   wherein each of the spraying robot and the handling robot comprises a carriage mounted sliding on the rail and on which an arm is articulated whereof an end opposite the carriage bears, for the spraying robot, a coating product sprayer and, for the handling robot, a handling member, and wherein the two carriages are mounted on two opposite or adjacent sides of the rail,
   wherein the rail has a polygonal section, wherein each carriage slides along at least one surface of the rail and wherein at least one of the carriages slides along at least two adjacent surfaces of the rail, and
   wherein the rail has a U- or C-shaped section and wherein the carriage belonging to one of the spraying robot or the handling robot slides along at least one inner surface of the rail, while the carriage belonging to the other of the spraying robot or the handling robot slides along at least one outer surface of the rail.

2. The installation according to claim 1, wherein the flow of ventilation air in the booth is vertical and downward, while the rail is positioned above the objects to be coated.

3. The installation according to claim 1, wherein the rail comprises at least one surface along which part of the carriage of the spraying robot and part of the carriage of handling robot slide.

4. The installation according to claim 1, wherein the movement of each carriage along the rail is driven by a motor equipped with a pinion meshing with a rack.

5. The installation according to claim 1, wherein each carriage is moved along the rail by a belt, chain or cable transmission system.

* * * * *